United States Patent Office 3,091,686
Patented May 28, 1963

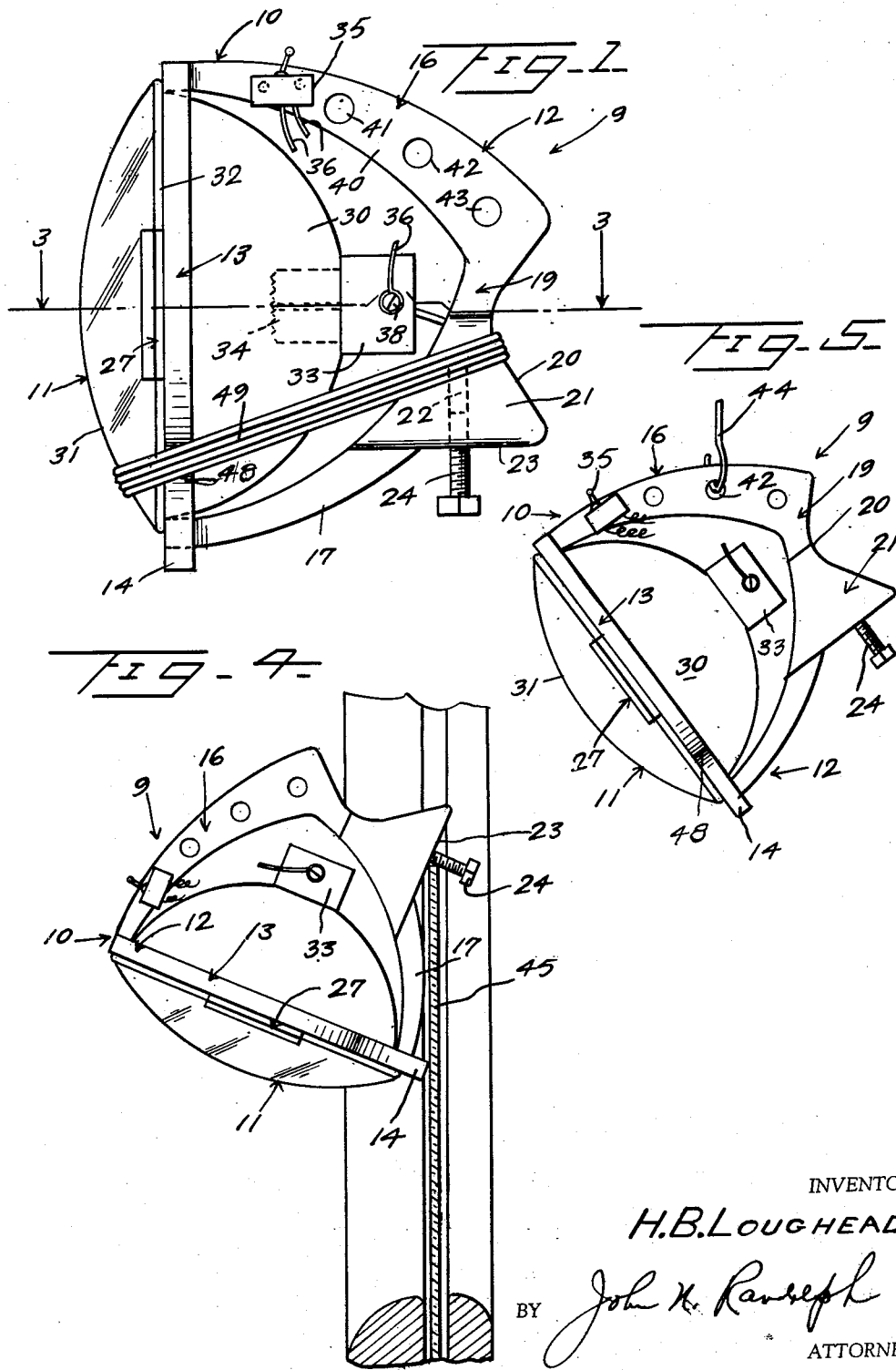

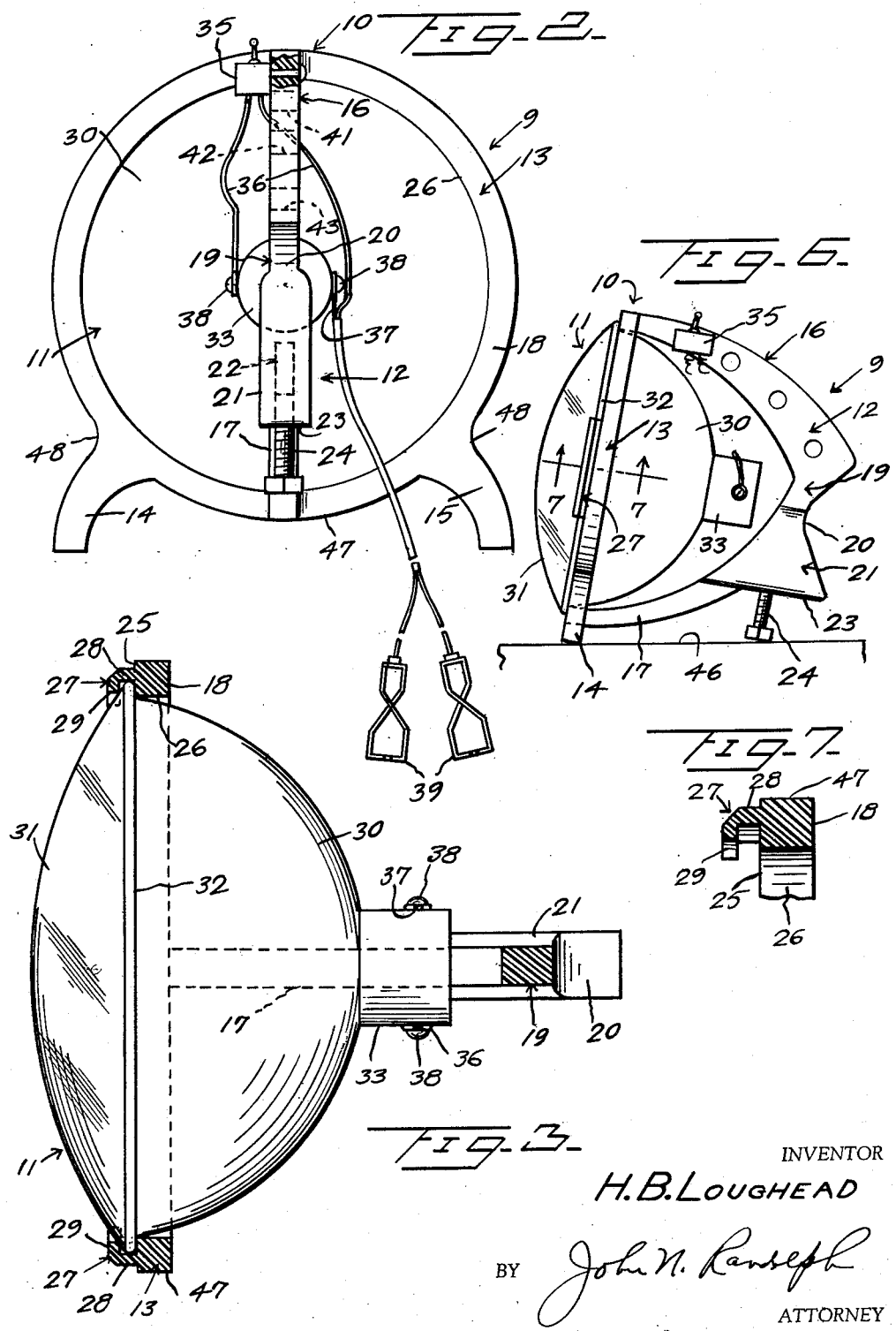

3,091,686
PORTABLE LIGHT
Howard B. Loughead, 107 N. 5 Point Road,
West Chester, Pa.
Filed Dec. 4, 1961, Ser. No. 156,655
1 Claim. (Cl. 240—8.18)

This invention relates to a portable light primarily adapted to be used in conjunction with a motor vehicle, as a trouble-light for illuminating a vehicle wheel, while fixing a flat tire, for illuminating the interior of the engine compartment, and for numerous other uses.

More particularly, it is an object of the invention to provide a novel support in which a conventional sealed beam headlight unit is adapted to be mounted and which is equipped with wiring capable of being connected to the headlight unit and to a convenient source of electric current.

A further object of the invention is to provide a support or holder which is so constructed that it can be conveniently carried as a portable light, rested on a supporting surface with the axis of the sealed beam unit disposed at different angles relative to the supporting surface, or which may be suspended in a hanging position and with the axis of the sealed beam unit disposed at different angles.

Still a further object of the invention is to provide such a support or holder which may be very economically manufactured, which will be extremely durable, which may be readily attached to or detached from a conventional sealed beam headlight unit, and which will protect the unit while applied to the holder.

Various other objects and advantages of the invention will hereinafter become more fully apparent from the following description of the drawings, illustrating a presently preferred embodiment thereof, and wherein:

FIGURE 1 is a side elevational view showing the portable light as it will appear when not in use;

FIGURE 2 is a rear elevational view thereof, partly broken away;

FIGURE 3 is an enlarged horizontal sectional view, partially in top plan, taken substantially along the line 3—3 of FIGURE 1;

FIGURE 4 is a side elevational view, on a reduced scale, showing one position of use of the portable light;

FIGURE 5 is a similar view showing a second position of use thereof;

FIGURE 6 is a view similar to FIGURES 4 and 5 and illustrating a third position of use of the portable light, and FIGURE 7 is an enlarged fragmentary transverse sectional view taken through a part of the holder, substantially along a plane as indicated by the line 7—7 of FIGURE 6.

Referring more specifically to the drawings, the portable light in its entirety is designated generally 9 and comprises a holder, designated generally 10, and a conventional sealed beam type headlight unit, designated generally 11.

The holder 10 includes a frame, designated generally 12, which is preferably formed of plastic and which includes an annular rim 13 constituting the front of the frame 12. The rim 13 has circumferentially spaced outwardly projecting extensions forming downwardly extending inwardly curved supporting legs 14 and 15 the lower ends or extremities of which are disposed coplanar, as seen in FIGURE 2.

The frame 9 also includes a top portion 16 and a bottom portion 17. The portions 16 and 17 are disposed coplanar and at substantially a right angle to the rim 13, and constitute the rear portion of the frame 12. The top portion 16 is formed integral with and extends rearwardly from the top portion of a rear face 18 of the rim 13 and is curved downwardly. The bottom portion 17 is formed integral with and projects from the bottom portion of said rear face 18 and is curved upwardly. The frame portions 16 and 17 merge integrally at their rear ends to provide a back portion 19 which includes a rearwardly facing concavely arced rear surface 20. A lower part 21 of the back portion 19 is laterally thickened and is provided with a threaded recess 22 having an open lower end which opens downwardly through a bottom surface 23 of the back part 21 to receive a screw 24 which is adjustably mounted therein and which projects downwardly from the surface 23 to provide a third supporting leg of the holder 10.

As best seen in FIGURES 3 and 7, the rim 13 is of rectangular cross section and has a front face 25 and an inner face 26. Two corresponding circumferentially elongated lugs 27 are formed integral with the rim 13 and project from its front face 25. The lugs 27 are disposed diametrically opposite to one another and are preferably spaced equal distances between the frame portions 16 and 17. The lugs 27 are arcuately curved to conform to the curvature of the rim 13 and each includes a shank portion 28 which projects outwardly from the front face 25 and a flange 29 which extends inwardly from the shank 28 and which is spaced from said face 25. The shank 28 and flange 29 each extends from end-to-end of the lug 27.

The sealed beam lamp unit 11 includes a rear portion 30 forming a reflector and a front portion 31 forming the lens. The portions 30 and 31 are convexly bowed away from one another and are joined together at their outer edges by a protruding annular rim portion 32 which fits into the lugs 27 and which is yieldably clamped between the flanges 29 and the front face 25. The reflector portion 30 extends rearwardly through the rim 13 into the frame 12 and a conventional electric socket 33 is attached in a conventional manner to the exterior of the center rear portion of the reflector part 30 to complete an electrical connection with a filament 34, disposed within the reflector portion 30. The socket 33 is likewise disposed within the frame 12, forwardly of and adjacent the back portion 19.

A conventional electric switch 35 is mounted on the top portion 16, adjacent the rim 13. Conductors 36 and 37 are electrically connected to and lead from two contacts 38 of the socket 33 and are provided at their opposite ends with conventional battery post engaging clamps 39. The switch 35 is interposed in the conductor 36 for making and breaking the electrical connection between a current source, not shown, such as a storage battery to which the clamps 39 are connected, and the socket 33.

The part of the top portion 16, located behind the switch 35, constitutes a handgrip 40 which is spaced sufficiently from the reflector portion 30 and socket 33 to accommodate the fingers of the hand grasping the handle 40 when the portable light 9 is manually supported. The handle 40 is provided with three longitudinally spaced openings 41, 42 and 43 which may be selectively engaged by a hook 44 or other supporting element for suspending the light 9 with the axis of the lamp unit 11 disposed at different angles, as illustrated in FIGURE 5.

The electric cord 36, 37 may be of different lengths, so that when the clamps 39 are engaging the posts of a storage battery of a motor vehicle, for example, the light 9 may be positioned adjacent any wheel of the vehicle, and any interior part of the vehicle or, for example, in a tent or other enclosure such as a car top tent connected to the vehicle, from which latter position the light 9 can be suspended by the hook 44. The hook 44 can also be utilized for suspending the light at different angles beneath the open hood of the vehicle. The light 9 may also be supported, as illustrated in FIGURE 4, on a partially opened window 45 of a vehicle, directed either inwardly or outwardly of the vehicle. In this latter position the legs 14 and 15 bear against one side of the window and the leg 24 engages over the upper edge of the window.

The light 9 may also be supported on a substantially horizontal supporting surface 46, such as a roadway, resting on the legs 14, 15 and 24, as illustrated in FIGURE 6. The lower end of the adjustable leg 24 is disposed above the plane of the legs 14 and 15 so that the rim 13 will be inclined upwardly and rearwardly, as seen in FIGURE 6, to prevent the light from overturning forwardly.

The portions of the outer edges of the legs 14 and 15 which merge with the outer edge 47 of the rim 13 form concavely grooved portions 48 which combine with the surface 20 to provide three portions about which the wiring 36, 37 can be wound when the light 9 is not in use. A casing 49, enclosing the wires 36 and 37, from adjacent the clamps 39 to adjacent the socket 33, will assist in protecting the lamp unit 11 when the light 9 is stored, as for example in the trunk of a vehicle. When the wiring is wrapped as shown in FIGURE 1, one or both of the clamps 39, not shown in FIGURE 1, may be engaged with any convenient part of the frame 12.

The frame 12 is preferably formed of plastic and at least the lugs 27 and rim 13 are formed of a relatively soft resilient plastic to yieldably support the lamp unit 11 and so that the lugs 27 can be sprung apart for applying the rim portion 32 thereto or for detaching said rim portion therefrom.

Various modifications and changes are contemplated and may be resorted to, without departing from the function or scope of the invention as hereinafter defined by the appended claim.

I claim as my invention:

A portable light comprising a sealed beam type lamp unit including a reflector portion containing a filament and a lens portion, said lens portion and reflector portion being bulged away from one another and being joined by an annular external bead portion; a holder including an annular rim defining the front of the holder and having circumferentially spaced lugs projecting from a front side thereof and in which portions of the bead are received for detachably securing the lamp unit to the holder with the lens portion projecting from said front side of the rim and the reflector portion extending through and projecting from the opposite rear side of the rim, said holder including a rear part formed integral with said rim and disposed therebehind and in a plane substantially perpendicular to the plane of the rim, said rear part including a top portion extending rearwardly and downwardly from an uppermost part of the rim and forming a handle and a bottom portion extending rearwardly and upwardly from a lowermost part of the rim and merging with said top portion, a pair of front legs formed integral with and extending downwardly from circumferentially spaced portions of the rim and disposed on opposite sides of said rear part, a rear leg connected to and extending downwardly from said bottom portion of the rear part above and remote from said front legs, and means adjustably mounting said rear leg for varying the elevation of the rear leg relative to the front legs whereby the sealed beam unit is supported in the holder inclined upwardly at different angles.

References Cited in the file of this patent

UNITED STATES PATENTS

| | | |
|---|---|---|
| 863,951 | Steskel | Aug. 20, 1907 |
| 1,116,847 | Russell | Nov. 10, 1914 |
| 2,278,545 | Gravenstine | Apr. 7, 1942 |
| 2,334,900 | Bosten et al. | Nov. 23, 1943 |
| 2,338,092 | Brown | Jan. 4, 1944 |
| 2,579,653 | Dawley | Dec. 25, 1951 |
| 2,662,970 | Zediker | Dec. 15, 1953 |
| 2,775,221 | Olson | Dec. 25, 1956 |
| 2,803,742 | Bellamy | Aug. 20, 1957 |